Sept 10, 1957.   R. F. HAUPT   2,805,610
MECHANISM FOR AUTOMATICALLY ADJUSTING THE
DIAPHRAGM OF A PHOTOGRAPHIC OBJECTIVE
Filed April 12, 1954
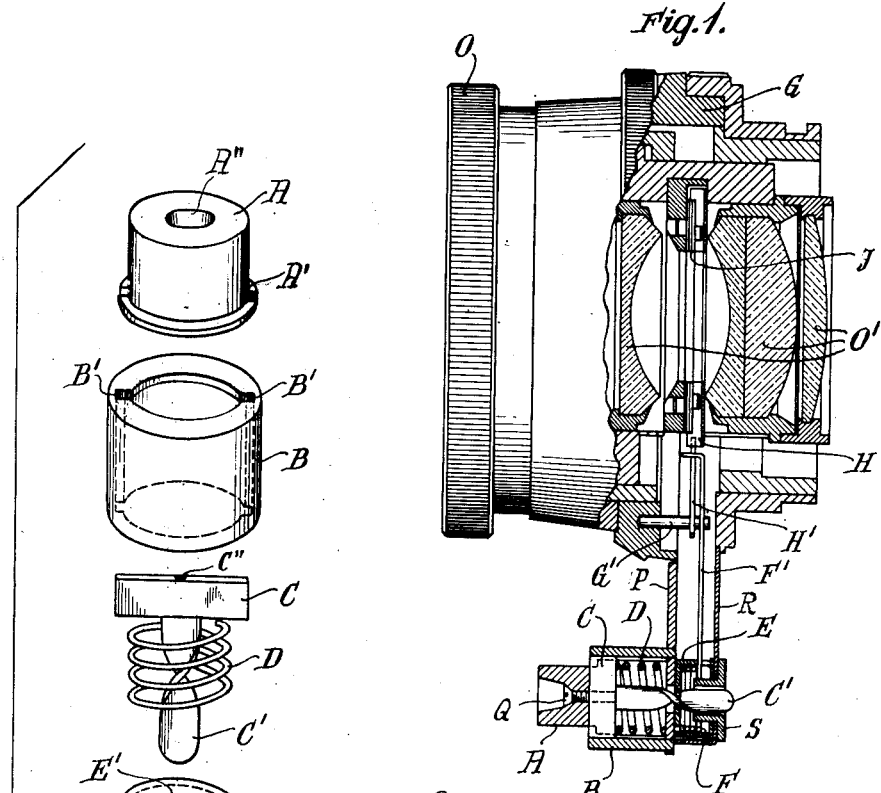
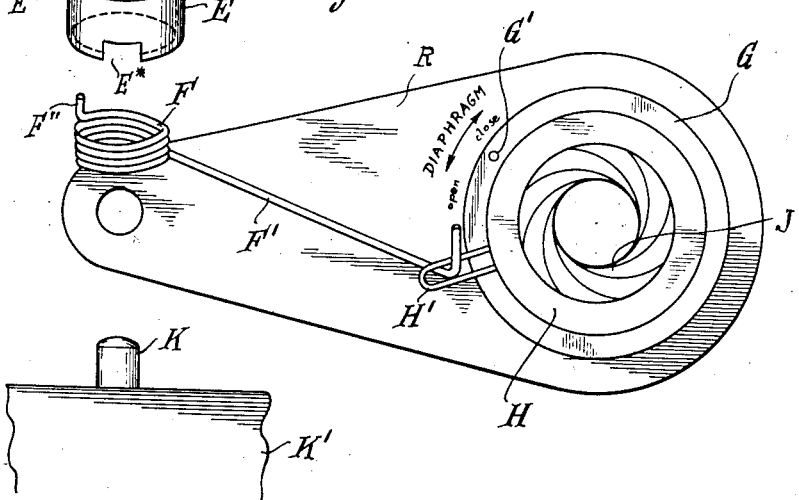
INVENTOR:
Rudolf F. Haupt
BY
Karl F. Ross
AGENT

United States Patent Office 2,805,610
Patented Sept. 10, 1957

2,805,610

MECHANISM FOR AUTOMATICALLY ADJUSTING THE DIAPHRAGM OF A PHOTOGRAPHIC OBJECTIVE

Rudolf Friedrich Haupt, Gottingen-Weende, Germany, assignor to Isco Optische Werke G. m. b. H., Gottingen-Weende, Germany, a limited liability company Application April 12, 1954, Serial No. 422,591

Claims priority, application Germany April 11, 1953

2 Claims. (Cl. 95—64)

My present invention relates to photographic reflex cameras of the so-called "one-eye" type in which the same objective is used for focusing and for picture-taking purposes. In such arrangements, it is desirable to have means for maintaining the diaphragm of the objective in its position of maximum opening and for returning it, preferably automatically, to a preselected stop just before the shutter is operated. Various arrangements of this description have been proposed in which the user, when focusing, operates a lever or the like to bring the diaphragm to wide-open position where it is retained by a suitable detent; this detent is coupled with the shutter so that operation of the latter releases the diaphragm control member and enables a restoring force, generally that of a spring, to bring it into contact with an abutment that has been preset to a position corresponding to the selected diaphragm opening.

The principal object of the present invention is to provide a mechanism of this general character in which the diaphragm is normally held in its wide-open position and is returned to its preselected opening only momentarily, in response to the operation of an actuating element adapted to trip the shutter release, thereby relieving the user of the necessity of manipulating the diaphragm before focusing.

The foregoing object is realized, in accordance with my invention, by the provision of a resilient link between an actuating element and a diaphragm control member, this link being arranged normally to maintain the diaphragm control member in a predetermined position (generally the position corresponding to maximum opening) and to displace the control member against an adjustable stop when the actuating element is operated, thereafter again returning it to its normal position. The actuating element may be conveniently used to operate the usual shutter trip button immediately after the control member has been brought to its selected stop position.

A more specific feature of my invention resides in the provision of a coupling adapted to translate linear motion of the actuating element into a swinging movement of the resilient link. This coupling comprises, in a preferred embodiment, a slider axially movable in internal grooves of a guide sleeve and provided with a helicoidally twisted shank passing through a slot in a rotatable but axially fixed cup, the latter serving as an anchorage for an extremity of a coil spring; the other extremity of the coil spring extends approximately radially outwardly from the cup to constitute the aforementioned resilient link.

The above and other objects and features of my present invention will become more fully apparent from the following detailed description having reference to the accompanying drawing, in which:

Fig. 1 is a side elevation, partly in section, of an objective provided with a diaphragm-adjusting mechanism according to the invention; and Fig. 2 is an exploded, somewhat schematic view of the elements of the mechanism itself.

The actuating element shown in the drawing comprises a knob A movable in a guide sleeve B and provided with a diametrical slot A' aligned with a pair of longitudinal grooves B' within sleeve B. The grooves B' receive the two side wings of a slider C lodged in slot A' of knob A, the knob and the slider being secured together by a screw Q passing through aligned openings A'', C'' thereof.

A helicoidally twisted shank C' of slider C traverses a slot E' in a disk forming part of a cup-shaped member E which encloses a coil spring F. A compression spring D, surrounding the shank C', is inserted between the wings of slider C and a cover plate P to which the sleeve B is attached, thereby urging the slider and the knob A away from the cup E. The entire assembly A, B, C, D, E, F, P is supported, as clearly shown in Fig. 1, on a projecting part of a diaphragm mount R serving to hold the iris leaves J; the position of these iris leaves, inserted between lenses of the objective O' which is mounted in a barrel controlled by focusing ring O, is determined by a rotatable ring H carrying a loop H'. Control ring H is surrounded by a setting ring G which is manually rotatable, under guidance of a suitable scale (not shown), to preselect a diaphragm opening as indicated by the legend in Fig. 2; a stop pin G' on ring G projects into the path of loop H' which in turn is engaged by an extension F' of coil spring F passing through a slot E' on cup E. The other extremity of spring F, designated F'', is anchored to a hole E'' in cup E.

The free end of shank C', guided in a bushing S within mount R, is positioned adjacent a shutter release button K projecting from camera body K', as indicated schematically in Fig. 2.

The operation of the system just described is as follows:

Normally, knob A and slider C are pressed outwardly (to the left in Fig. 1) by the spring D, thereby causing cup E to occupy an angular position in which the link F' maintains the loop H' on control ring H in its position of maximum diaphragm opening. When the user depresses knob A, shank C' sets cup E into rotation and imparts a torque to coil spring F which displaces ring H clockwise (as viewed in Fig. 2) until the loop H' strikes the pin G' of ring G. It will be understood that setting ring G is adapted to retain its selected position either by friction or with the aid of suitable indexing means known per se. After loop H' has engaged pin G', further rotation of cup E during the continued advance of slider C results merely in a tightening of spring F along with some flexing of the resilient link F'. Toward the end of its travel, the free end of shank C' depresses shutter trip button K, after which the knob A is released and the elements C, E, F and H return to their normal position.

If the setting ring G had been preset to wide-open position, the entire rotation of cup E would have been translated into a deformation of spring member F, F'.

The invention is, of course, not limited to the specific embodiment described and illustrated but may be realized in a variety of modifications without departing from the spirit and scope of the appended claims. Thus it may be mentioned, by way of example, that the arrangement shown in the drawing may be reversed by attaching a twisted shank, such as C', to the rotatable system E, F and providing a corresponding slot, such as E', on some part of the sliding system A, C.

I claim:

1. In a photographic objective, in combination, an elongated support extending transversely to the optical axis of the objective, a movable diaphragm-control member on said support, adjustable stop means in the path of movement of said control member presettable to a selected diaphragm opening, a cup-shaped retaining element rotatably mounted on a part of said support remote from said control member, a coil spring received in said retaining element with freedom of radial contraction therein, said coil spring having one extremity anchored to said retaining element and having another extremity projecting in a generally radial direction beyond said retaining element, said projecting extremity being anchored to said control member and forming an elongated resilient link between the latter and said retaining element, and an actuating member operable to rotate said retaining element between a normal position and an off-normal position, said link maintaining said control member in a position corresponding to maximum diaphragm opening in the normal position of said retaining element but urging said control member against said stop means in the off-normal position of said element.

2. The combination according to claim 1, wherein said retaining element is provided with a transverse slot passing through its axis, said actuating member being provided with a helically twisted shank passing through said slot and having a tip projecting axially beyond said retaining element, further comprising guide means at the periphery of said retaining element for holding said actuating member against rotation.

References Cited in the file of this patent

UNITED STATES PATENTS

| | | |
|---|---|---|
| 931,380 | Burk | Aug. 17, 1909 |
| 2,058,531 | Tuttle | Oct. 27, 1936 |
| 2,213,742 | Mihalyi | Sept. 3, 1940 |
| 2,242,013 | Martin | May 13, 1941 |
| 2,262,509 | McNabb | Nov. 11, 1941 |
| 2,343,206 | Rath | Feb. 29, 1944 |
| 2,435,752 | Pearce | Feb. 10, 1948 |

FOREIGN PATENTS

| | | |
|---|---|---|
| 289,719 | Switzerland | July 1, 1953 |